(12) United States Patent
Maeda et al.

(10) Patent No.: US 12,031,471 B2
(45) Date of Patent: Jul. 9, 2024

(54) MATTING, EXHAUST GAS PURIFICATION DEVICE, AND METHOD FOR MANUFACTURING MATTING

(71) Applicant: IBIDEN CO., LTD., Ogaki (JP)

(72) Inventors: Toshiyuki Maeda, Takahama (JP); Takayuki Kawabe, Takahama (JP)

(73) Assignee: IBIDEN CO., LTD., Ogaki (JP)

(*) Notice: Subject to any disclaimer, the term of this patent is extended or adjusted under 35 U.S.C. 154(b) by 0 days.

(21) Appl. No.: 18/475,207

(22) Filed: Sep. 27, 2023

(65) Prior Publication Data

US 2024/0018889 A1    Jan. 18, 2024

Related U.S. Application Data

(63) Continuation of application No. PCT/JP2022/013606, filed on Mar. 23, 2022.

(30) Foreign Application Priority Data

Mar. 31, 2021   (JP) .................. 2021-060531

(51) Int. Cl.
    *F01N 3/28*     (2006.01)
    *B01D 53/88*    (2006.01)
(52) U.S. Cl.
    CPC ........... *F01N 3/2835* (2013.01); *B01D 53/88* (2013.01)
(58) Field of Classification Search
    None
    See application file for complete search history.

(56) References Cited

U.S. PATENT DOCUMENTS

| | | |
|---|---|---|
| 2009/0223644 A1 | 9/2009 | Araki et al. |
| 2009/0285726 A1 | 11/2009 | Ohshika et al. |
| 2009/0304560 A1* | 12/2009 | Dietz .................. B32B 7/12 428/323 |
| 2012/0110805 A1 | 5/2012 | Ohshika et al. |
| 2013/0118138 A1 | 5/2013 | Kumano |
| 2013/0295370 A1 | 11/2013 | Araki et al. |
| 2015/0033714 A1 | 2/2015 | Satoh et al. |

FOREIGN PATENT DOCUMENTS

| | | |
|---|---|---|
| CN | 1250736 | 4/2000 |
| CN | 101194070 | 6/2008 |
| CN | 101581245 | 11/2009 |
| JP | 2003-262116 | 9/2003 |
| JP | 2013-127244 | 6/2013 |
| JP | 2013-155750 | 8/2013 |

(Continued)

OTHER PUBLICATIONS

Ito et al. WO2015098413A1-translated document (Year: 2015).*
Written Opinion for corresponding International Application No. PCT/JP2022/013606, Jun. 14, 2022.

*Primary Examiner* — Jelitza M Perez
(74) *Attorney, Agent, or Firm* — MORI & WARD, LLP

(57) ABSTRACT

A mat material having a sufficiently high initial compression surface pressure is provided. The mat material of the present disclosure includes inorganic fibers; and an inorganic binder and an organic binder attached to the inorganic fibers, wherein the mat material has an initial compression surface pressure of 900 kPa or more as measured when compressed to a bulk density of 0.50 g/cm$^3$.

4 Claims, 3 Drawing Sheets

(56) References Cited

FOREIGN PATENT DOCUMENTS

| JP | 2015-214907 | 12/2015 | | |
|----|----|----|----|----|
| JP | 2016-108397 | 6/2016 | | |
| JP | 2016-108987 | 6/2016 | | |
| WO | WO 2013/111428 | 8/2013 | | |
| WO | WO-2015098413 A1 * | 7/2015 | ........... | F01N 3/2853 |

* cited by examiner

Cross-sectional view taken along line A-A

MATTING, EXHAUST GAS PURIFICATION DEVICE, AND METHOD FOR MANUFACTURING MATTING

TECHNICAL FIELD

The present disclosure relates to a mat material, an exhaust gas purification device, and a method of producing a mat material.

BACKGROUND ART

The exhaust gas discharged from internal combustion engines (e.g., diesel engines) contains particulate matter (hereinafter also referred to as "PM") such as soot. Adverse effects of PM on the environment and human bodies have been problems. The exhaust gas also contains harmful gas components such as CO, HC, and NOx, which creates concerns about the impact of such harmful gas components on the environment and human bodies.

Thus, various exhaust gas purification apparatuses that collect PM in an exhaust gas or purify harmful gas components have been proposed. Such exhaust gas purification apparatuses include an exhaust gas treatment unit made of porous ceramic, a casing for housing the exhaust gas treatment unit, and a mat material made of an inorganic fiber aggregate and arranged between the exhaust gas treatment unit and the casing. The mat material is arranged mainly for preventing the exhaust gas treatment unit from being damaged by contact with the casing that covers the periphery of the exhaust gas treatment unit due to vibrations and impacts caused by the operation of automobiles or the like, as well as for preventing exhaust gas leakage from a space between the exhaust gas treatment unit and the casing. Thus, the mat material is required to have a function to securely hold the exhaust gas treatment unit by increasing the surface pressure generated by repulsion upon compression.

As such a mat material, Patent Literature 1 discloses a sealing material for an exhaust emission control catalytic converter, which consists of a sheet-like molding formed by integrating inorganic short fibers and an organic binder by a papermaking method, wherein the organic binder is burned off to expand the molding 1.3 to 6 times in a thickness direction thereof so as to generate a restoration surface pressure due to the inorganic short fibers, and the fiber mass per unit plane area of 100 cm² inside the molding is within a mass average ±8% in every portion.

Patent Literature 1 also discloses a method of producing the sealing material, the method including preparing a slurry by dispersing inorganic short fibers in a medium; molding the slurry into a desired sheet shape by a papermaking method; and drying the sheet. An organic binder is present in the slurry at the time of cutting of the sheet as needed and/or is added to the sheet that has been molded, and the drying is performed while a compression force is applied to the sheet.

CITATION LIST

Patent Literature

Patent Literature 1: JP 2003-262116 A

SUMMARY OF INVENTION

Technical Problem

Patent Literature 1 discloses a method of producing a mat material by the papermaking method. The resulting mat material has a problem in that its initial compression surface pressure is not high enough.

The present disclosure was made to solve the above problem. The present disclosure aims to provide a mat material having a sufficiently high initial compression surface pressure.

Solution to Problem

As a result of extensive studies, the inventors of the present disclosure found that the initial compression surface pressure of the mat material according to Patent Literature 1 is low because the inorganic fiber dispersion of inorganic fibers for use in producing the mat material by papermaking contains many twisted strings of the inorganic fibers twisted together.

The mat material of the present disclosure includes inorganic fibers; and an inorganic binder and an organic binder attached to the inorganic fibers, wherein the mat material has an initial compression surface pressure of 900 kPa or more as measured when compressed to a bulk density of 0.50 g/cm³.

In the mat material of the present disclosure, an inorganic binder is attached to the inorganic fibers. The inorganic binder forms irregularities on the surfaces of the inorganic fibers. Such irregularities improve the friction coefficient between the inorganic fibers. This, as a result, improves the initial compression surface pressure of the mat material.

In the mat material of the present disclosure, an organic binder is attached to the inorganic fibers. The organic binder makes the inorganic fibers slippery on each other. Thus, the inorganic fibers when subjected to high stress can be displaced and are less prone to damage. As a result, the compression surface pressure of the mat material does not easily decrease even when stress is continuously applied to the mat material.

The mat material of the present disclosure has an initial compression surface pressure of 900 kPa or more as measured when the mat material is compressed to a bulk density of 0.50 g/cm³. Thus, the initial compression surface pressure is sufficiently high.

Accordingly, the mat material of the present disclosure when used in an exhaust gas purification device can prevent exhaust gas leakage and falling of the exhaust gas treatment unit from the metal casing due to gas pressure.

In the mat material of the present disclosure, preferably, the inorganic binder has a weight percentage of more than 0 wt % and 10 wt % or less relative to the mat material.

When the weight percentage of the inorganic binder in the mat material of the present disclosure is in the above range, the inorganic fibers have sufficient irregularities formed on their surfaces, resulting in a higher friction coefficient between the inorganic fibers. This, as a result, improves the initial compression surface pressure of the mat material.

In the mat material of the present disclosure, preferably, the organic binder has a weight percentage of more than 0 wt % and 10 wt % or less relative to the mat material.

When the weight percentage of the organic binder in the mat material of the present disclosure is in the above range, the inorganic fibers are sufficiently slippery on each other and less prone to damage. Thus, the compression surface pressure of the mat material does not easily decrease even when stress is continuously applied to the mat material.

In the mat material of the present disclosure, preferably, the inorganic binder and the organic binder are each attached in a dispersed state to surfaces of the inorganic fibers.

When the inorganic binder and the organic binder are each attached in a dispersed state to the surfaces of the inorganic fibers, it means that the inorganic binder and the organic binder are evenly attached to the surfaces of the inorganic fibers. This improves the effects associated with the presence of the inorganic binder and the organic binder, i.e., the effect of improving the initial compression surface pressure of the mat material, and the effect of reducing or preventing a decrease in the compression surface pressure of the mat material even when stress is continuously applied to the mat material.

Preferably, the mat material of the present disclosure further contains a polymeric dispersant.

In the production of the mat material of the present disclosure, use of a polymeric dispersant in attaching the inorganic binder and the organic binder to the surfaces of the inorganic fibers facilitates uniform attachment of the inorganic binder and the organic binder to the surfaces of the inorganic fibers.

In the mat material of the present disclosure, aggregates of the inorganic binder and the organic binder may be attached to the surfaces of the inorganic fibers.

Regardless of the attachment of aggregates of the inorganic binder and the organic binder to the surfaces of the inorganic fibers, it is possible to achieve the effect of improving the initial compression surface pressure of the mat material and the effect of reducing or preventing a decrease in the compression surface pressure of the mat material even when stress is continuously applied to the mat material.

The mat material of the present disclosure may be a mat produced by papermaking.

The mat produced by papermaking is produced by depositing the inorganic fibers onto a papermaking screen, so that the inorganic fibers are less prone to damage during production, which makes it easy to improve the initial compression surface pressure of the mat material.

Preferably, the mat material of the present disclosure is produced by subjecting an inorganic fiber-binder mixture to papermaking, the inorganic fiber-binder mixture being a mixture of an inorganic fiber dispersion containing inorganic fibers having an underwater bulk specific gravity of 0.001 to 0.02 g/cm$^3$, an inorganic binder, and an organic binder.

The reason why the surface pressure is generated on the mat material is because friction is generated at a contact point between the inorganic fibers, resulting in a force that prevents movement of the inorganic fibers. When there are many contact points between the inorganic fibers in the mat material, there are many points at which friction occurs, which improves the surface pressure of the mat material.

When the mat material includes a twisted string of the inorganic fibers twisted together, the inorganic fibers forming the twisted string are in the form of a bundle, so that the twisted string can be regarded as a single inorganic fiber. Thus, the number of inorganic fibers in the mat material is small. The specific surface area of the total inorganic fibers in the mat material is also small. Accordingly, there are fewer contact points between the inorganic fibers in the mat material, and the initial compression surface pressure of the mat material tends to be low.

The inorganic fiber dispersion having an underwater bulk specific gravity of 0.001 to 0.02 g/cm$^3$ results in a small number of existing twisted strings of the inorganic fibers twisted together. The number of existing twisted strings is also small in the mat material produced from such an inorganic fiber dispersion. This can sufficiently increase the number of contact points between the inorganic fibers in the mat material, which as a result improves the initial compression surface pressure of the mat material.

In the mat material produced using such an inorganic fiber dispersion, the inorganic fibers are uniformly dispersed, so that the stress can be easily dispersed. Thus, the inorganic fibers are less prone to damage even when stress is continuously applied to the mat material. As a result, the compression surface pressure of the mat material does not easily decrease even when stress is continuously applied to the mat material.

In the mat material of the present disclosure, preferably, the mat material includes twisted strings of the inorganic fibers twisted together, and in a cross section parallel to a thickness direction of the mat material, a cross-sectional area percentage of the twisted strings is 0.5% or more and 10% or less relative to a cross-sectional area of the mat material.

When the cross-sectional area percentage of the twisted strings relative to the cross-sectional area of the mat material is in the above range, the number of existing twisted strings is appropriate, which improves the initial compression surface pressure of the mat material.

Preferably, the mat material of the present disclosure has a compression surface pressure of 175 kPa or more when compressed to a bulk density of 0.45 g/cm$^3$ after 1000 repetitions of one cycle of compressing the mat material to a bulk density 0.50 g/cm$^3$ and then decompressing the mat material to a bulk density to 0.45 g/cm$^3$.

Such a mat material is resistant to degradation of the compression surface pressure and is thus suitable as a mat material for exhaust gas purification devices.

The exhaust gas purification device of the present disclosure includes: an exhaust gas treatment unit; a metal casing for housing the exhaust gas treatment unit; and a mat material for holding the exhaust gas treatment unit between the exhaust gas treatment unit and the metal casing, wherein the mat material is the mat material of the present disclosure.

The exhaust gas purification device of the present disclosure includes the mat material of the present disclosure. Thus, the mat material has a sufficiently high initial compression surface pressure and can prevent exhaust gas leakage and falling of the exhaust gas treatment unit from the metal casing due to gas pressure.

The method of producing the mat material of the present disclosure includes: a defibrating step of defibrating pre-defibration inorganic fibers by adding water to the pre-defibration inorganic fibers to produce an inorganic fiber dispersion; an inorganic fiber-binder mixture producing step of mixing the inorganic fiber dispersion with an inorganic binder and an organic binder to obtain an inorganic fiber-binder mixture; a papermaking step of subjecting the inorganic fiber-binder mixture to papermaking and dehydration to obtain a mat precursor; and a heating and pressurizing step of heating and pressurizing the mat precursor to obtain a mat material.

According to the method of producing in the mat material of the present disclosure, in the defibrating step, the pre-defibration inorganic fibers are defibrated such that the inorganic fibers after defibration has an underwater bulk specific gravity of 0.001 to 0.02 g/cm$^3$.

Adjusting the underwater bulk specific gravity of the inorganic fibers after defibration to the above range can result in a small number of existing twisted strings in the inorganic fiber dispersion.

DESCRIPTION OF EMBODIMENTS

Hereinafter, the mat material of the present disclosure is described.

The present disclosure is not limited to the structures described below, and suitable modifications may be made without departing from the scope of the present disclosure. The present disclosure also encompasses a combination of two or more preferred structures of the present disclosure described below.

The mat material according to the present disclosure is described with reference to the drawings.

Figure 1:
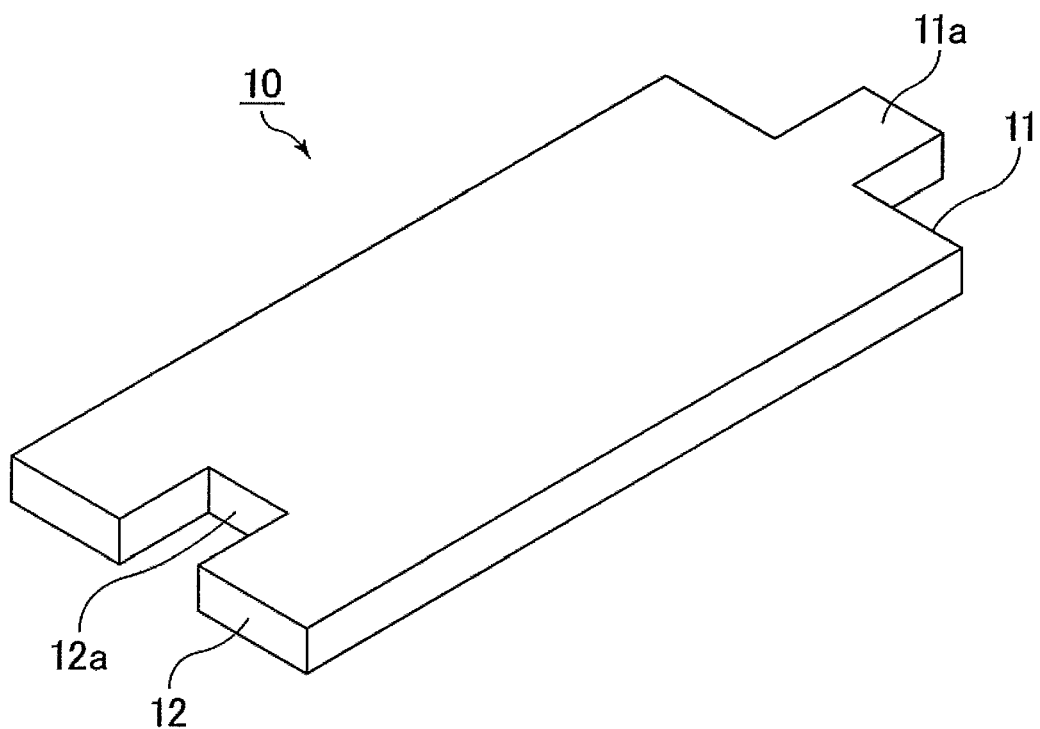
FIG. 1 is a schematic perspective view of an example of a mat material according to the present disclosure.

FIG. 1 is a schematic perspective view of an example of the mat material according to the present disclosure.

As shown in FIG. 1, a mat material 10 is rectangular in a planar view. The mat material 10 includes a protrusion 11a at one end 11 and a recess 12a at the other end 12 such that the ends fit each other when the mat material 10 is wound around an object.

The mat material 10 provided with the protrusion 11a and the recess 12a has better sealing properties when arranged in an exhaust gas purification device (described later).

In the mat material 10 shown in FIG. 1, the protrusion 11a and the recess 12a are each formed at the center in a traverse direction of the mat material 10. However, in the mat material of the present disclosure, the protrusion and the recess may not necessarily be formed at the respective centers in the traverse direction of the mat material as long as they fit each other. For example, a lateral side of the protrusion may be integrated with a lateral side of the mat material. In other words, the end may be formed in an L-shape in the planar view of the mat material.

In the mat material 10 shown in FIG. 1, the protrusion 11a and the recess 12a are rectangular. However, in the mat material of the present disclosure, the protrusion and the recess may have different shapes such as triangles and semicircles as long as they can fit each other.

The mat material 10 shown in FIG. 1 includes the protrusion 11a and the recess 12a formed thereon. However, in the mat material of the present disclosure, such protrusion and recess may not necessarily be formed at the respective ends of the mat material.

The shape of such a mat material may be a parallelogram, for example, in the planar view of the mat material. The parallelogram includes rectangles. When the mat material having such a shape is wound around an object, one end can be brought into suitable contact with the other end. The one end and the other end of the mat material may not necessarily be formed linearly. For example, the one end and the other end may be jagged such that these ends suitably contact each other.

The mat material 10 includes inorganic fibers; and an inorganic binder and an organic binder attached to the inorganic fibers, wherein the mat material 10 has an initial compression surface pressure of 900 kPa or more as measured when compressed to a bulk density of 0.50 g/cm³.

The initial compression surface pressure is preferably 950 kPa or more, more preferably 1000 kPa or more. The initial compression surface pressure is preferably 1400 kPa or less, more preferably 1200 kPa or less.

In the mat material 10, an inorganic binder is attached to the inorganic fibers. The inorganic binder forms irregularities on the surfaces of the inorganic fibers. Such irregularities improve the friction coefficient between the inorganic fibers. This, as a result, improves the initial compression surface pressure of the mat material 10.

In the mat material 10, an organic binder is attached to the inorganic fibers. The organic binder makes the inorganic fibers slippery on each other. Thus, the inorganic fibers when subjected to high stress can be displaced and are less prone to damage. As a result, the compression surface pressure of the mat material 10 does not easily decrease even when stress is continuously applied to the mat material 10.

The mat material 10 has an initial compression surface pressure of 900 kPa or more as measured when the mat material 10 is compressed to a bulk density of 0.50 g/cm³. Thus, the initial compression surface pressure is sufficiently high.

Thus, the mat material 10 when used in an exhaust gas purification device (described later) can prevent exhaust gas leakage and falling of an exhaust gas treatment unit from a metal casing due to gas pressure.

The surface pressure of the mat material 10 can be measured, for example, using a heater-equipped, hot surface pressure measuring device available from MTS.

Preferably, the mat material 10 has a compression surface pressure of 175 kPa or more, more preferably 175 to 230 kPa when compressed to a bulk density of 0.45 g/cm³ after 1000 repetitions of one cycle of compressing the mat material 10 to a bulk density 0.50 g/cm³ and then decompressing the mat material 10 to a bulk density to 0.45 g/cm³.

The mat material 10 described above is resistant to degradation of the compression surface pressure and is thus suitable as a mat material for exhaust gas purification devices (described later).

In other words, exhaust gases repeatedly flow into the exhaust gas purification device, so that the exhaust gas treatment unit and the metal casing constituting the exhaust gas purification device undergo volume changes repeatedly due to heat.

The mat material disposed in the exhaust gas purification device is repeatedly compressed and decompressed along with volume changes in the exhaust gas treatment unit and the metal casing.

When the mat material 10 has the features described above, the compression surface pressure of the mat material 10 is sufficiently high even when compression and decompression are repeated, so that the exhaust gas treatment unit can be sufficiently held in the metal casing even when exhaust gases repeatedly flow into the exhaust gas purification device.

The term "one cycle" as used herein refers to the following description.

First, the mat material is disposed between an upper plate and a lower plate of a heater-equipped device for measuring the hot surface pressure.

Next, the upper plate is moved at a speed of 25.4 mm/min at room temperature to compress the mat material until the bulk density is 0.50 g/cm³. Then, the mat material is maintained for 10 minutes.

Subsequently, with the mat material in a compressed state, the upper plate is heated to 900° C. and the lower plate is heated to 650° C. at a heating rate of 45° C./min.

Next, with the temperature of the upper plate maintained at 900° C. and the temperature of the lower plate maintained at 650° C., the upper plate is moved at a speed of 25.4 mm/min to decompress the mat material until the bulk density is 0.45 g/cm. Then, the mat material is maintained in that state for five minutes. The compression and decompression mentioned above are preparatory operations to acclimate the mat material to the device and are not included in the one cycle described herein.

Next, with the temperature of the upper plate maintained at 900° C. and the temperature of the lower plate maintained at 650° C., the upper plate is moved at a speed of 25.4 mm/min to compress the mat material again until the bulk density is 0.50 g/cm$^3$, and the mat material is maintained for 10 minutes.

Next, the temperature of the upper plate maintained at 900° C. and the temperature of the lower plate maintained at 650° C., the upper plate is moved at a speed of 25.4 mm/min to decompress the mat material again until the bulk density is 0.45 g/cm$^3$, and the mat material is maintained for 10 minutes.

The step of compressing the mat material again to a bulk density of 0.50 g/cm$^3$ and the step of decompressing the mat material again to a bulk density of 0.45 g/cm$^3$ constitute one cycle.

The average fiber length of the inorganic fibers is preferably 0.1 to 10 mm, more preferably 0.2 to 8 mm.

The inorganic fibers having an average fiber length of less than 0.1 mm are too short in length. Thus, a mat material made of such inorganic fibers has poor shape retainability. Further, such inorganic fibers do not suitably entangle with each other when formed into a mat material, which makes it difficult to achieve sufficient surface pressure.

The inorganic fibers having an average fiber length of more than 10 mm are too long in length and entangle too tightly with each other in an inorganic fiber dispersion obtained by dispersing the inorganic fibers in water in the papermaking step. Thus, the inorganic fibers are likely to accumulate non-uniformly when formed into a mat material, and the shear strength tends to be low.

To measure the inorganic fiber length, an inorganic fiber is pulled out from the mat material with tweezers without breaking the inorganic fiber, and the fiber length is measured using an optical microscope.

The term "average fiber length" as used herein refers to the average length determined by measuring the lengths of 300 inorganic fibers pulled out from the mat material. When the inorganic fibers cannot be pulled out from the mat material without breaking, it may be degreased the mat material, introduce the degreased mat material into water, and collect the inorganic fibers without breaking while loosening the entangled inorganic fibers.

In the mat material 10, the average fiber diameter of the inorganic fibers is preferably 3 to 8 μm, more preferably 5 to 7 μm.

The inorganic fibers having an average fiber diameter of less than 3 μm have low strength and are easily cut by impact or the like.

The inorganic fibers having an average fiber diameter of more than 8 μm tend to have too large a fiber diameter, a high Young's modulus, and a low flexibility.

Examples of the inorganic fibers include alumina fibers, alumina-silica fibers, silica fibers, glass wool, and rockwool. Of these, alumina-silica fibers are preferred.

These inorganic fibers have high heat resistance. The mat material made of these inorganic fibers is thus less prone to deformation caused by temperature changes.

Further, when the inorganic fibers are alumina-silica fibers, the ratio by weight of alumina to silica is preferably alumina ($Al_2O_3$):silica ($SiO_2$)=60:40 to 80:20, more preferably alumina ($Al_2O_3$):silica ($SiO_2$)=70:30 to 74:26.

The mat material 10 may include two or more types of inorganic fibers in combination.

In the mat material 10, any inorganic binder, such as alumina sol, silica sol, aerogel, fumed silica, or titanium particles, may be used.

The mat material 10 may contain two or more inorganic binders in combination.

In the mat material 10, the weight percentage of the inorganic binder relative to the mat material 10 is preferably more than 0 wt %, more preferably 0.3 wt % or more. The weight percentage is also preferably 10 wt % or less, more preferably 8 wt % or less.

When the weight percentage of the inorganic binder in the mat material 10 is in the above range, the inorganic fibers have sufficiently many irregularities formed on their surfaces, resulting in a higher friction coefficient between the inorganic fibers. This, as a result, improves the initial compression surface pressure of the mat material.

In the mat material 10, any organic binder, such as a rubber-based resin, a styrene-based resin, a silicone-based resin, an acrylic resin, a polyester-based resin, or a polyurethane resin, may be used.

The mat material 10 may contain two or more organic binders in combination.

In the mat material 10, the weight percentage of the organic binder relative to the mat material 10 is preferably more than 0 wt %, more preferably 0.3 wt % or more. The weight percentage is also preferably 10 wt % or less, more preferably 8 wt % or less.

When the weight percentage of the organic binder in the mat material 10 is in the above range, the inorganic fibers become sufficiently slippery on each other so that the inorganic fibers are less prone to damage. Thus, the compression surface pressure of the mat material 10 does not easily decrease even when stress is continuously applied to the mat material 10.

The mat material 10 may contain a polymeric dispersant, a flocculant, and a surfactant in addition to the organic binder and the inorganic binder.

In the production of the mat material 10 of the present disclosure, use of a polymeric dispersant in attaching the inorganic binder and the organic binder to the surfaces of the inorganic fibers facilitates uniform attachment of the inorganic binder and the organic binder to the surfaces of the inorganic fibers. This improves the effect of improving the initial compression surface pressure of the mat material 10 and the effect of reducing or preventing a decrease in the compression surface pressure of the mat material 10 even when stress is continuously applied to the mat material 10.

The mat material 10 produced as described above contains a polymeric dispersant.

Any polymeric dispersant may be used. Examples include hydrophilic synthetic polymers such as anionic polymeric dispersants (e.g., polycarboxylic acids and/or salts thereof, naphthalene sulfonate formaldehyde condensates and/or salts thereof, polyacrylic acids and/or salts thereof, polymethacrylic acids and/or salts thereof, and polyvinylsulfonic acids and/or salts thereof) and nonionic polymeric dispersants (e.g., polyvinyl alcohol, polyvinyl pyrrolidone, and polyethylene glycol); natural hydrophilic polymers such as gelatin, casein, and water-soluble starch; and hydrophilic semisynthetic polymers such as carboxymethyl cellulose.

Of these, the polymeric dispersant is preferably a hydrophilic synthetic polymer, more preferably an anionic polymeric dispersant. The number average molecular weight of the anionic polymeric dispersant is preferably 500 to 100000. The number average molecular weight of the anionic polymeric dispersant can be calculated, for example, from molecular weight measurements by gel permeation chromatography (GPC).

Any flocculant, such as acrylamide, may be used.

In the production of the mat material 10, use of a flocculant facilitates entanglement of the inorganic binder and the organic binder with the inorganic fibers.

Preferably, the mat material 10 has a thickness of 5 to 20 mm.

The mat material having a thickness of less than 5 mm easily undergoes a decrease in surface pressure. In addition, when such a mat material is used in an exhaust gas purification device (described later), the exhaust gas treatment unit easily falls out. In addition, such a mat material does not easily absorb volume changes of the exhaust gas treatment unit when the exhaust gas treatment unit undergoes volume changes. Thus, the exhaust gas treatment unit is susceptible to cracking and the like.

The mat material having a thickness of more than 20 mm is difficult to handle due to lack of flexibility. In addition, such a mat material when wound around an exhaust gas treatment unit (described later) is susceptible to winding wrinkles and breakage.

The basis weight (weight per unit area) of the mat material 10 is not limited but is preferably 200 to 4000 $g/m^2$, more preferably 900 to 3000 $g/m^2$. When the mat material has a basis weight of less than 200 $g/m^2$, the holding force tends to be insufficient.

When the mat material has a basis weight of more than 4000 $g/m^2$, the bulk of the mat material tends not to be reduced.

The bulk density of the mat material 10 when uncompressed is preferably 0.10 to 0.30 $g/cm^3$, more preferably 0.10 to 0.25 $g/cm^3$.

When the mat material has a bulk density of less than 0.10 $g/cm^3$, the inorganic fibers are loosely entangled and easily separated. This makes it difficult to maintain the shape of the mat material in a predetermined shape.

The mat material having a bulk density of more than 0.30 $g/cm^3$ is hard and is thus easily breakable.

In the mat material 10, preferably, the inorganic binder and the organic binder are each attached in a dispersed state to the surfaces of the inorganic fibers.

When the inorganic binder and the organic binder are each attached in a dispersed state to the surfaces of the inorganic fibers, it means that the inorganic binder and the organic binder are attached to the surfaces of the inorganic fibers evenly. This improves the effects associated with the presence of the inorganic binder and the organic binder, i.e., the effect of improving the initial compression surface pressure of the mat material 10, and the effect of reducing or preventing a decrease in the compression surface pressure of the mat material 10 even when stress is continuously applied to the mat material 10.

In the mat material 10, aggregates of the inorganic binder and the organic binder may be attached to the surfaces of the inorganic fibers.

Even if the aggregates of the inorganic binder and the organic binder are attached to the surfaces of the inorganic fibers, it is possible to achieve the effect of improving the initial compression surface pressure of the mat material 10 and the effect of reducing or preventing a decrease in the compression surface pressure of the mat material 10 even when stress is continuously applied to the mat material 10.

In the mat material 10, whether the inorganic binder and the organic binder are each attached in a dispersed state to the surfaces of the inorganic fibers and whether the aggregates of the inorganic binder and the organic binder are attached to the surfaces of the inorganic fibers can be determined by taking out inorganic fibers from the mat material 10 and observing the surfaces of the inorganic fibers using a scanning electron microscope (SEM).

The mat material 10 may be a mat produced by papermaking or a needle-punched mat, but a mat produced by papermaking is preferred.

When the mat material 10 is a mat produced by papermaking, the mat material 10 is produced by depositing the inorganic fibers onto a papermaking screen, so that the inorganic fibers are less prone to damage, which makes it easy to improve the initial compression surface pressure of the mat material 10.

In addition, simply adding an inorganic binder and an organic binder to the inorganic fiber dispersion for use in papermaking can attach the inorganic binder and the organic binder to the resulting inorganic fibers.

When the mat material 10 is a mat produced by papermaking, preferably, the mat material 10 is produced by subjecting an inorganic fiber-binder mixture to papermaking, the inorganic fiber-binder mixture being a mixture of an inorganic fiber dispersion containing inorganic fibers having an underwater bulk specific gravity of 0.001 to 0.02 $g/cm^3$, an inorganic binder, and an organic binder. In the inorganic fiber dispersion, the underwater bulk specific gravity of the inorganic fibers is more preferably 0.002 to 0.01 $g/cm^3$.

The reason why the surface pressure is generated on the mat material 10 is because friction is generated at a contact point between the inorganic fibers, resulting in a force that prevents movement of the inorganic fibers. When there are many contact points between the inorganic fibers in the mat material 10, there are many points at which friction occurs, which improves the surface pressure of the mat material 10.

When the mat material 10 includes a twisted string of the inorganic fibers twisted together, the inorganic fibers forming the twisted string are in the form of a bundle, so that the twisted string can be regarded as a single inorganic fiber. Thus, the number of inorganic fibers in the mat material 10 is small. The specific surface area of the total inorganic fibers in the mat material 10 is also small. Accordingly, there are fewer contact points between the inorganic fibers in the mat material 10, and the initial compression surface pressure of the mat material 10 tends to be low.

The inorganic fiber dispersion having an underwater bulk specific gravity of 0.001 to 0.02 $g/cm^3$ results in a small number of existing twisted strings of the inorganic fibers twisted together. The number of existing twisted strings is also small in the mat material 10 produced from such an inorganic fiber dispersion. This can sufficiently increase the number of contact points between the inorganic fibers in the mat material 10, which as a result improves the initial compression surface pressure of the mat material 10.

In the mat material 10 produced using such an inorganic fiber dispersion, the inorganic fibers are uniformly dispersed, so that the stress can be easily dispersed. Thus, the inorganic fibers are less prone to damage even when stress is continuously applied to the mat material 10. As a result, the compression surface pressure of the mat material 10 does not easily decrease even when stress is continuously applied to the mat material 10.

The expression "underwater bulk specific gravity of the inorganic fibers in the mat material" as used herein refers to a value measured by the following method.

First, the mat material is heated at 600° C. for one hour to burn off organic components.

Next, 0.5 g of inorganic fibers are collected from the heated mat material by loosening the inorganic fibers with hands. Subsequently, the collected inorganic fibers are placed in a container holding 80 mL of water and stirred at 1000 rpm for 10 minutes.

Next, the aqueous solution containing the inorganic fibers is transferred to a 100-mL graduated cylinder, and further, water is added until the lower surface of the meniscus of the aqueous solution reaches the 100 mL mark.

After leaving the solution to stand for 30 minutes, the sedimentation height of the inorganic fibers is read, and the product of the sedimentation height of the inorganic fibers and the base area of the graduated cylinder is determined as the underwater volume of the inorganic fibers. Then, the weight (0.5 g) of the inorganic fibers is divided by the underwater volume of the inorganic fibers. The resulting value is regarded as the underwater bulk specific gravity of the inorganic fibers in the mat material.

Preferably, the mat material 10 is produced by subjecting an inorganic fiber-binder mixture to papermaking, the inorganic fiber-binder mixture being a mixture of an inorganic fiber dispersion containing a surfactant, an inorganic binder, and an organic binder.

In the production of the inorganic fiber dispersion, water is added to pre-defibration inorganic fibers, and the pre-defibration inorganic fibers are shredded into short fibers for defibration. Here, defibration in the presence of a surfactant results in inorganic fibers that are not easily twisted with each other into twisted strings.

When the mat material 10 is obtained by papermaking using an inorganic fiber dispersion with fewer twisted strings, the number of existing twisted strings in the resulting mat material 10 is also small, which improves the initial compression surface pressure of the mat material 10. The compression surface pressure of the mat material 10 does not easily decrease even when stress is continuously applied to the mat material 10.

Any type of surfactant, such as a polycarboxylic acid-based surfactant or an acrylic surfactant, may be used.

Of these, a polycarboxylic acid-based surfactant is preferred. The polycarboxylic acid-based surfactant can increase the negative charge on the fiber surface, which makes the inorganic fibers repel each other, so that the inorganic fibers are further less easily twisted with each other.

When the mat material 10 is a mat produced by papermaking, preferably, the mat material 10 includes twisted strings of the inorganic fibers twisted together, and in a cross section parallel to a thickness direction of the mat material 10, a cross-sectional area percentage of the twisted strings is 0.5% or more relative to a cross-sectional area of the mat material 10. The cross-sectional area percentage is more preferably 0.7% or more. The cross-sectional area percentage of the twisted strings is also preferably 10% or less, more preferably 9% or less.

When the cross-sectional area percentage of the twisted strings relative to the cross-sectional area of the mat material 10 is in the above range, the number of existing twisted strings is appropriate, which improves the initial compression surface pressure of the mat material 10.

The expression "the cross-sectional area percentage of the twisted strings relative to the cross-sectional area of the mat material" as used herein refers to a value calculated by the following method.

First, the mat material is cut parallel to the thickness direction, and the cut surface is scanned. Next, a region (50 mm vertical×50 mm horizontal) is selected at any position of the cross section, and the region is obtained as image data.

The obtained image data is binarized to make the cross-sectional portions of the twisted string identifiable from the rest.

Next, the cross-sectional area of the twisted strings is calculated, and the cross-sectional area percentage of the twisted strings in the image is calculated.

The same operation is repeated three times, except that different regions are selected on the cross section of the mat material. The average cross-sectional area percentage of the twisted strings in each image is regarded as the cross-sectional area percentage of the twisted strings relative to the cross-sectional area of the mat material.

Next, an exhaust gas purification device including the mat material 10 is described.

The exhaust gas purification device including the mat material 10 is also encompassed by the present disclosure.

Figure 2:
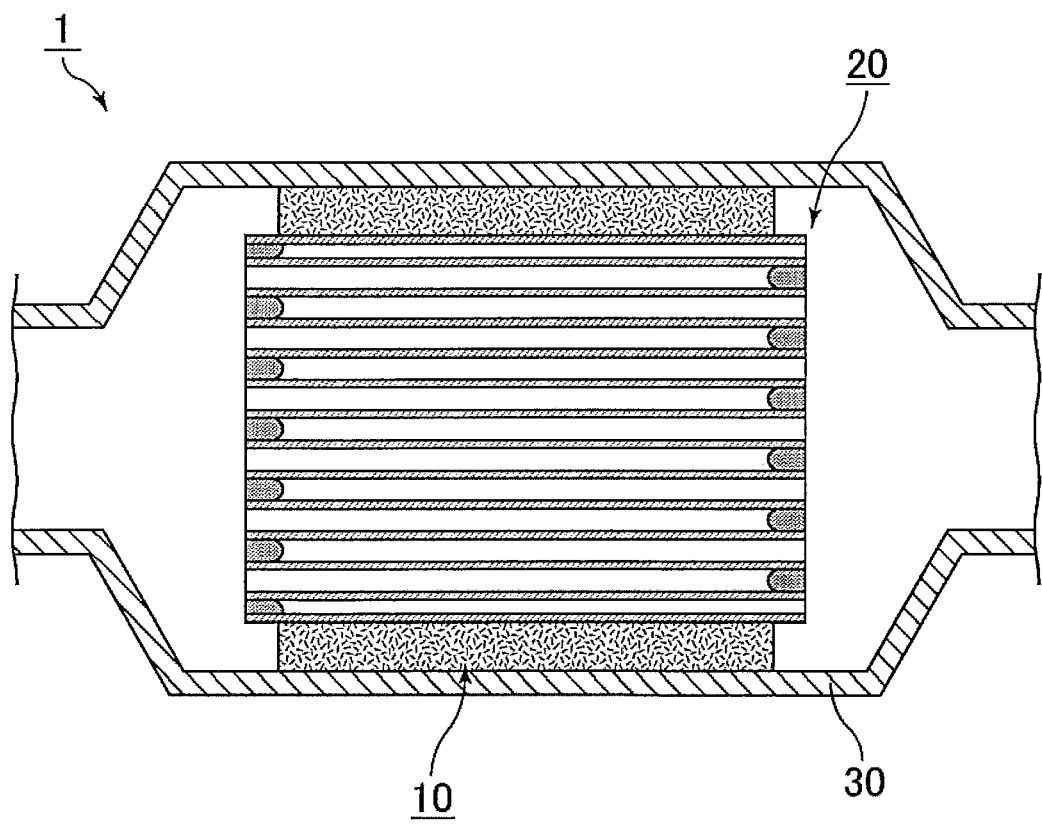
FIG. 2 is a schematic cross-sectional view of an example of an exhaust gas purification apparatus of the present disclosure.

FIG. 2 is a schematic cross-sectional view of an example of the exhaust gas purification apparatus of the present disclosure.

As shown in FIG. 2, an exhaust gas purification device 1 includes an exhaust gas treatment unit 20, a metal casing 30 for housing the exhaust gas treatment unit 20, and the mat material 10 between the exhaust gas treatment unit 20 and the metal casing 30. In the exhaust gas purification device 1, the mat material 10 functions as a holding sealing material.

The exhaust gas purification device 1 includes the mat material 10. The mat material 10, which has a sufficiently high initial compression surface pressure, can prevent exhaust gas leakage and falling of the exhaust gas treatment unit 20 from the metal casing 30 due to gas pressure.

Next, the exhaust gas treatment unit 20 that constitutes the exhaust gas purification device 1 is described.

Figure 3A:
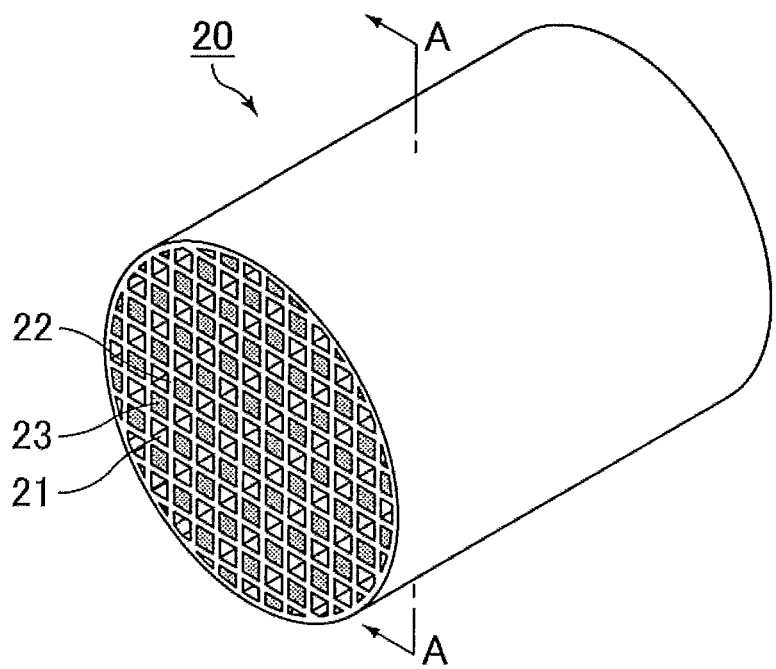
FIG. 3A is a schematic perspective view of an example of an exhaust gas treatment unit constituting the exhaust gas purification device of the present disclosure.
Figure 3B:
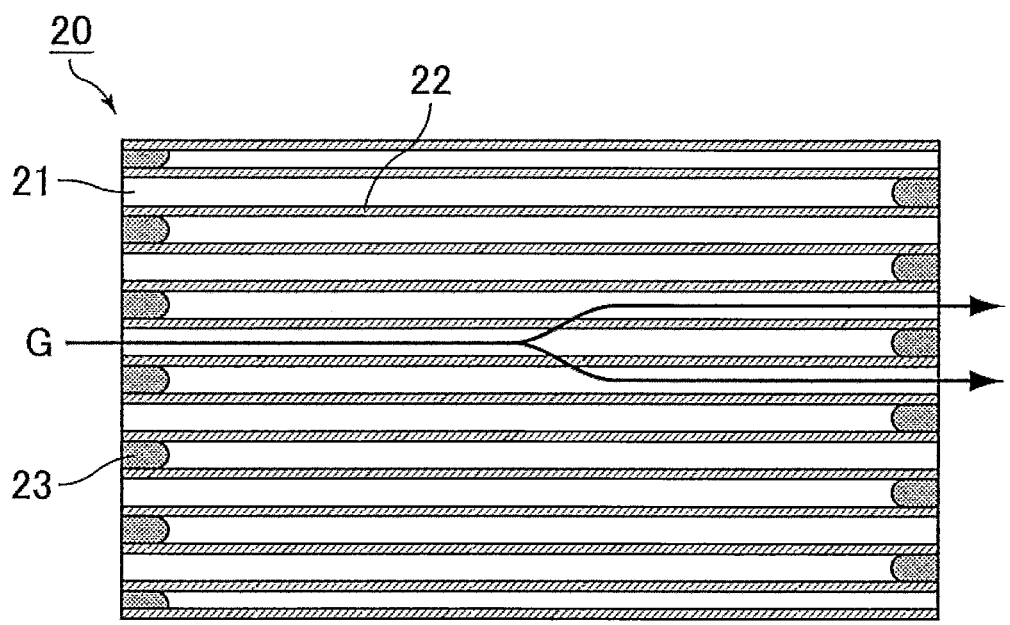
FIG. 3B is a cross-sectional view of FIG. 3A taken along line A-A.

FIG. 3A is a schematic perspective view of an example of the exhaust gas treatment unit constituting the exhaust gas purification device of the present disclosure. FIG. 3B is a cross-sectional view of FIG. 3A taken along line A-A.

As shown in FIG. 3A and FIG. 3B, the exhaust gas treatment unit 20 included in the exhaust gas purification device 1 has a round pillar shape in which many cells 21 are arranged in parallel in a longitudinal direction with a cell wall 22 between each cell.

The exhaust gas treatment unit 20 is an exhaust gas filter (honeycomb filter) in which one end of each cell 21 is plugged with a sealing material 23.

As shown in FIG. 3B, an exhaust gas discharged from the internal combustion engine and flowed into the exhaust gas treatment unit 20 (in FIG. 3B, the exhaust gas is indicated by G, and the flow of exhaust gas is indicated by arrows) flows into one of the cells 21 that is open at an exhaust gas inlet-side end face of the exhaust gas treatment unit 20, and then passes through the cell wall 22 between each cell 21. Here, PM in the exhaust gas is collected by the cell wall 22, and the exhaust gas is purified. The purified exhaust gas is discharged to the outside via another cell 21 that is open at an exhaust gas outlet-side end face.

The exhaust gas treatment unit 20 shown in FIG. 3A and FIG. 3B is a filter in which one end of each cell 21 is plugged with the sealing material 23. However, in the exhaust gas treatment unit constituting the exhaust gas purification device of the present disclosure, each cell may not necessarily be plugged at one end. Such an exhaust gas treatment unit can be suitably used as a catalyst carrier.

The exhaust gas treatment unit 20 may be made of a porous non-oxide ceramic such as silicon carbide or silicon nitride or may be made of a porous oxide ceramic such as sialon, alumina, cordierite, or mullite. Of these, silicon carbide is preferred.

When the exhaust gas treatment unit 20 is made of porous ceramic such as silicon carbide, the porosity of the porous ceramic is not limited but is preferably 35 to 60%.

When the porosity is less than 35%, the exhaust gas treatment unit may be easily clogged; whereas when the porosity is more than 60%, the exhaust gas treatment unit may easily break due to low strength.

The average pore size of the porous ceramic is preferably 5 to 30 μm.

When the average pore size is less than 5 μm, PM may easily cause clogging.

When the average pore size is more than 30 μm, the exhaust gas treatment unit may not be able to function as a filter because PM may pass through the pore and cannot be collected.

The porosity and the pore size can be measured by a conventionally known method using a scanning electron microscope (SEM).

The density of the cells in a cross section of the exhaust gas treatment unit 20 is not limited, but a preferred lower limit is 31.0 pcs/cm$^2$ (200 pcs/inch$^2$), and a preferred upper limit is 93.0 pcs/cm$^2$ (600 pcs/inch$^2$). A more preferred lower limit is 38.8 pcs/cm$^2$ (250 pcs/inch$^2$), and a more preferred upper limit is 77.5 pcs/cm$^2$ (500 pcs/inch$^2$).

The exhaust gas treatment unit 20 may support a catalyst for conversion of exhaust gas. Preferred examples of catalysts to be supported include noble metals such as platinum, palladium, and rhodium. Of these, platinum is more preferred. Examples of other catalysts that can be used include alkali metals such as potassium and sodium and alkaline-earth metals such as barium. Each of these catalysts may be used alone or in combination of two or more thereof.

These catalysts, when supported, facilitate removal of PM by combustion and allow conversion of toxic exhaust gas.

Next, the metal casing 30 constituting the exhaust gas purification device 1 is described.

The metal casing 30 is substantially cylindrical.

Preferably, the inner diameter of the metal casing 30 (i.e., the inner dimeter of a portion where the exhaust gas treatment unit is housed) is slightly smaller than the diameter of the exhaust gas treatment unit 20 with the mat material 10 wound therearound.

When the inner diameter of the metal casing 30 has a length as described above, the mat material 10 is compressed after the exhaust gas treatment unit 20 with the mat material 10 wound therearound is press-fitted into the metal casing 30, which generates a surface pressure on the mat material 10.

As described above, the mat material 10, which has a sufficiently high initial compression surface pressure, can prevent exhaust gas leakage and falling of the exhaust gas treatment unit 20 from the metal casing 30 due to gas pressure.

The metal casing 30 is preferably made of stainless steel, although not limited thereto.

Next, a method of producing the mat material of the present disclosure is described.

The method of producing the mat material of the present disclosure includes: a defibrating step of defibrating pre-defibration inorganic fibers by adding water to the pre-defibration inorganic fibers to produce an inorganic fiber dispersion; an inorganic fiber-binder mixture producing step of mixing the inorganic fiber dispersion with an inorganic binder and an organic binder to obtain an inorganic fiber-binder mixture; a papermaking step of subjecting the inorganic fiber-binder mixture to papermaking and dehydration to obtain a mat precursor; and a heating and pressurizing step of heating and pressurizing the mat precursor to obtain a mat material.

Each step is described in detail below.

[Defibrating Step]

In the defibrating step, water is added to pre-defibration inorganic fibers to defibrate the pre-defibration inorganic fibers to produce an inorganic fiber dispersion.

The pre-defibration inorganic fibers may be produced by a conventionally known method; or commercially available pre-defibration inorganic fibers may be used.

The pre-defibration inorganic fibers may be produced by the following method, for example.

Specifically, a spinning mixture containing basic aluminum chloride and silica sol is spun by blowing to produce an inorganic fiber precursor. Next, the inorganic fiber precursor is compressed into a rectangular sheet, and the compressed sheet is fired, whereby pre-defibration inorganic fibers made of silica-alumina fibers can be produced.

Any defibration method may be used. The pre-defibration inorganic fibers may be first subjected to dry defibration and then wet defibration by adding water, or may only be subjected to wet defibration by adding water.

Defibration can be performed using a machine such as a slash pulper, a feather mill, a disk mill, a bale opener, a beater, a hammer mill, a carding machine, or a wool picker.

Defibration may be performed using one machine or two or more machines.

In the case of wet defibration, preferably, a slash pulper is used for defibration.

Wet defibration using a slash pulper may be performed by the following method, for example.

The pre-defibration inorganic fibers (10 kg) are mixed with water (1,000 L) and stirred in a slash pulper at 2000 to 5000 rpm for 5 to 60 minutes to shred the pre-defibration inorganic fibers into short fibers for defibration.

In the defibrating step, preferably, a surfactant is further added to the pre-defibration inorganic fibers for defibration.

The presence of the surfactant during defibration of the pre-defibration inorganic fibers can reduce entanglement of inorganic fibers with each other. As a result, the proportion of twisted strings of the inorganic fibers twisted together is low in the inorganic fiber dispersion after the defibrating step.

Such an inorganic fiber dispersion having a small number of existing twisted strings is used in the inorganic fiber-binder mixture producing step, the papermaking step, and the heating and pressurizing step, whereby a mat material having a sufficiently high initial compression surface pressure can be produced. The compression surface pressure of the mat material produced as described above does not easily decrease even when stress is continuously applied to the mat material.

Any type of surfactant, such as a polycarboxylic acid-based surfactant or an acrylic surfactant may be used in the defibrating step.

The amount of the surfactant for use in the defibrating step is not limited but is preferably 0.1 to 10 g relative to 1 L of water.

In the defibrating step, preferably, the pre-defibration inorganic fibers are defibrated such that the inorganic fibers after defibration have an underwater bulk specific gravity of 0.001 to 0.02 g/cm$^3$, more preferably 0.002 to 0.01 g/cm$^3$.

Adjusting the underwater bulk specific gravity of the inorganic fibers after defibration to be in the above range can result in a low proportion of twisted strings in the inorganic fiber dispersion.

When such an inorganic fiber dispersion is used in the later-described steps to produce a mat material, the number of existing twisted strings in the mat material produced is also small.

This can sufficiently increase the number of contact points between the inorganic fibers in the mat material, which as a result improves the initial compression surface pressure of the mat material.

In the mat material produced using such an inorganic fiber dispersion, the inorganic fibers are uniformly dispersed, so that the stress can be easily dispersed. Thus, the inorganic fibers are less prone to damage even when stress is continuously applied to the mat material produced. As a result, the compression surface pressure of the mat material produced does not easily decrease even when stress is continuously applied to the mat material.

The expression "underwater bulk specific gravity of the inorganic fibers after defibration" as used herein refers to a value measured by the following method.

First, the inorganic fibers after defibration are heated at 600° C. for one hour for drying.

Next, 0.5 g of the heated inorganic fibers are collected. Subsequently, the collected inorganic fibers are placed in a container holding 80 mL of water and stirred at 1000 rpm for 10 minutes.

Next, the aqueous solution containing the inorganic fibers is transferred to a 100-mL graduated cylinder, and further, water is added until the lower surface of the meniscus of the aqueous solution reaches the 100 mL mark.

After leaving the solution to stand for 30 minutes, the sedimentation height of the inorganic fibers is read, and the product of the sedimentation height of the inorganic fibers and the base area of the graduated cylinder is determined as the underwater volume of the inorganic fibers. Then, the weight (0.5 g) of the inorganic fibers is divided by the underwater volume of the inorganic fibers. The resulting value is regarded as the underwater bulk specific gravity of the inorganic fibers after defibration.

[Inorganic Fiber-Binder Mixture Producing Step]

In the inorganic fiber-binder mixture producing step, the inorganic fiber dispersion produced in the defibrating step is mixed with an inorganic binder and an organic binder to obtain an inorganic fiber-binder mixture.

Any inorganic binder, such as alumina sol, silica sol, aerogel, fumed silica, or titanium particles, may be used.

The weight of the inorganic binder to be added is preferably more than 0 wt %, more preferably 0.3 wt % or more relative to the weight of the inorganic fibers in the inorganic fiber dispersion. The weight percentage is also preferably 10 wt % or less, more preferably 8 wt % or less.

Any organic binder, such as a rubber-based resin, a styrene-based resin, a silicone-based resin, an acrylic resin, a polyester-based resin, or a polyurethane resin, may be used.

The weight of the organic binder to be added is preferably more than 0 wt %, more preferably 0.3 wt % or more relative to the weight of the inorganic fibers in the inorganic fiber dispersion. The weight percentage is also preferably 10 wt % or less, more preferably 8 wt % or less.

In this step, further, a polymeric dispersant, a flocculant, and a surfactant may be added to the inorganic fiber dispersion.

Adding a polymeric dispersant to the inorganic fiber dispersion facilitates uniform attachment of the inorganic binder and the organic binder to the surfaces of the inorganic fibers. Thus, the initial compression surface pressure of a mat material to be obtained through the later-described steps easily improves, and the compression surface pressure of the mat material does not easily decrease even when stress is continuously applied to the mat material.

Any polymeric dispersant may be used. Examples include hydrophilic synthetic polymers such as anionic polymeric dispersants (e.g., polycarboxylic acids and/or salts thereof, naphthalene sulfonate formaldehyde condensates and/or salts thereof, polyacrylic acids and/or salts thereof, polymethacrylic acids and/or salts thereof, and polyvinylsulfonic acids and/or salts thereof) and nonionic polymeric dispersants (e.g., polyvinyl alcohol, polyvinyl pyrrolidone, and polyethylene glycol); natural hydrophilic polymers such as gelatin, casein, and water soluble starch; and hydrophilic semisynthetic polymers such as carboxymethyl cellulose.

Of these, the polymeric dispersant is preferably a hydrophilic synthetic polymer, more preferably an anionic polymeric dispersant. The number average molecular weight of the anionic polymeric dispersant is preferably 500 to 100000.

Any flocculant, such as acrylamide, may be used.

Use of a flocculant allows the inorganic binder and the organic binder to easily adhere to the inorganic fibers.

[Papermaking Step]

In the papermaking step, the inorganic fiber-binder mixture produced in the inorganic fiber-binder mixture producing step is subjected to papermaking and dehydration to obtain a mat precursor.

The papermaking and dehydration methods and conditions are not limited, and any conventionally known methods and conditions may be employed.

For example, preferably, a continuous papermaking machine is used for papermaking such that the mat material after production has a basis weight of 1000 to 3000 g/m$^2$.

[Heating and Pressurizing Step]

In the heating and pressurizing step, the mat precursor produced in the papermaking step is heated and pressurized to obtain a mat material.

The heating and pressurizing conditions are preferably 100° C. to 300° C. for 5 to 15 minutes.

The mat material of the present disclosure can be produced through the above steps.

The resulting mat material can be cut into a desired size as needed.

EXAMPLES

An example that more specifically discloses the present disclosure is described below. The present disclosure is not limited to the following example.

Example 1

[Defibrating Step]

To an aqueous solution of basic aluminum chloride prepared to have an Al content of 70 g/L and an Al:Cl ratio of 1:1.8 (atomic ratio) was added silica sol to give a weight ratio of $Al_2O_3$:$SiO_2$ of 72:28 in inorganic fibers after firing.

Further, an organic polymer (polyvinyl alcohol) was added in an appropriate amount, whereby a mixture was prepared.

The resulting mixture was concentrated to obtain a spinning mixture, and the spinning mixture was spun by blowing, whereby an inorganic fiber precursor was produced. Subsequently, the inorganic fiber precursor was compressed to produce a rectangular sheet. The compressed sheet was fired at a maximum temperature of 1250° C. to produce pre-defibration inorganic fibers containing alumina and silica at a ratio by parts by weight of 72:28.

The pre-defibration inorganic fibers (10 kg) were introduced into water (1000 L). Further, a polycarboxylic acid-based surfactant (trade name: POIZ 530, manufactured by Kao Corporation) was added to a concentration of 1 g/L. Then, the mixture was stirred at 650 rpm for 20 minutes using a commercially available pulper (capacity: about 2000 L), whereby the pre-defibration inorganic fibers were shredded into short fibers to defibrate the pre-defibration inorganic fibers. Thus, an inorganic fiber dispersion was produced.

The inorganic fibers after defibration had an underwater bulk specific gravity of 0.01 g/cm$^3$.

[Inorganic Fiber-Binder Mixture Producing Step]

Next, an inorganic binder AS200 (product name, manufactured by Nissan Chemical Corporation) was added to the inorganic fiber dispersion, and an organic binder Nipool Lx854E (product name, manufactured by Zeon Corporation) was added thereto. The mixture was stirred at 650 rpm for one minute. Thus, an inorganic fiber-binder mixture was produced.

Here, the weight of the inorganic binder was adjusted to 2 wt % relative to the weight of the inorganic fibers in the inorganic fiber dispersion. The weight of the organic binder was adjusted to 7 wt % relative to the weight of the inorganic fibers in the inorganic fiber dispersion. The weight of the polymeric dispersant was adjusted to 1 wt % relative to the weight of the inorganic fibers in the inorganic fiber dispersion.

[Papermaking Step]

Next, the inorganic fiber-binder mixture produced was subjected to papermaking by a conventionally known method using a continuous papermaking machine to obtain a mat precursor having a basis weight of 1500 g/m$^2$ after drying.

[Heating and Pressurizing Step]

Next, the mat precursor was heated and pressurized at 200° C. for 10 minutes using a pressing machine, whereby a mat material was obtained.

The mat material was cut into a size of 300 cm (longitudinal)×100 cm (traverse), whereby a mat material according to Example 1 was produced.

The initial compression surface pressure of the mat material according to Example 1 was 902 kPa as measured when compressed to a bulk density of 0.50 g/cm$^3$.

Figure 4:
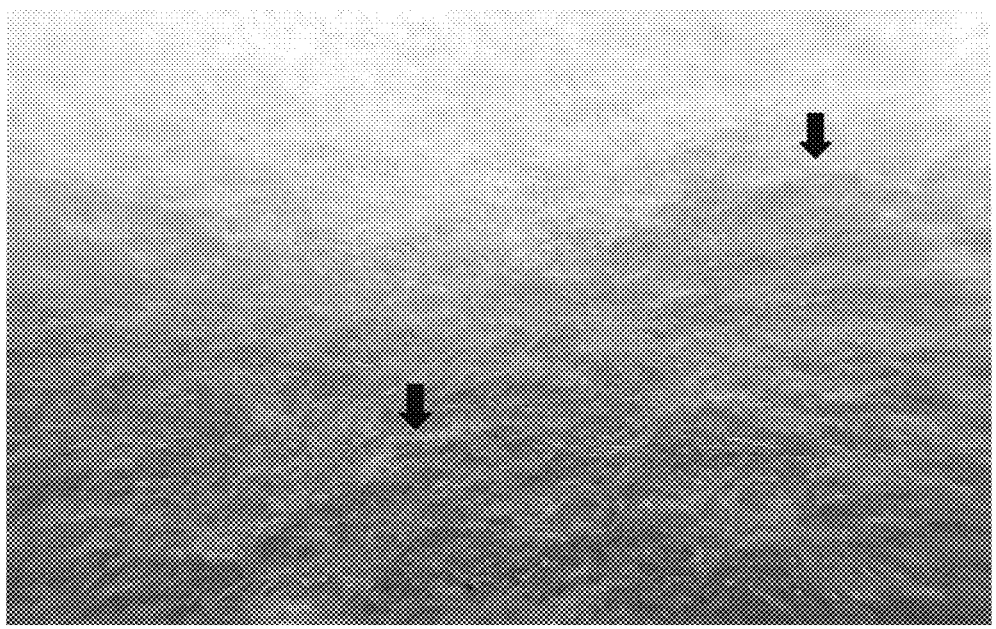
FIG. 4 is a cross-sectional image of a mat material according to Example 1 parallel to a thickness direction.

The mat material according to Example 1 was cut parallel to a thickness direction, and the cut surface was scanned. FIG. 4 shows a cross-sectional image of the mat material according to Example 1.

FIG. 4 is a cross-sectional image of the mat material according to Example 1 parallel to the thickness direction.

As shown in FIG. 4, the mat material according to Example 1 was observed to contain twisted strings of the inorganic fibers twisted together (indicated by arrows in FIG. 4).

In the mat material according to Example 1, the cross-sectional area percentage of the twisted strings was measured to be 0.5% relative to the cross-sectional area of the mat material.

Comparative Example 1

A mat material according to Comparative Example 1 was produced as in Example 1, except that the inorganic binder was not added in the inorganic fiber-binder mixture producing step.

The initial compression surface pressure of the mat material according to Comparative Example 1 was 812 kPa as measured when compressed to a bulk density of 0.50 g/cm$^3$.

Comparative Example 2

The mat material according to Comparative Example 2 was produced according to Example 1, except that the organic binder was not added in the inorganic fiber-binder mixture producing step.

The initial compression surface pressure of the mat material according to Comparative Example 2 was 885 kPa as measured when compressed to a bulk density of 0.50 g/cm$^3$.

[Compression and Decompression Test]

Regarding the mat materials according to Example 1 and Comparative Examples 1 and 2, the compression surface pressure after repeating the compression and decompression was measured by the following method.

Each mat material was disposed between an upper plate and a lower plate of a heater-equipped, hot surface pressure measuring device available from MTS.

Next, the upper plate was moved at a speed of 25.4 mm/min at room temperature to compress the mat material until the bulk density was 0.50 g/cm$^3$. Then, the mat material was maintained for 10 minutes.

Subsequently, with the mat material in a compressed state, the upper plate was heated to 900° C. and the lower plate was heated to 650° C. at a heating rate of 45° C./min.

Next, with the temperature of the upper plate maintained at 900° C. and the temperature of the lower plate maintained at 650° C., the upper plate was moved at a speed of 25.4 mm/min to decompress the mat material until the bulk density was 0.45 g/cm. Then, the mat material was maintained in that state for five minutes.

Next, with the temperature of the upper plate maintained at 900° C. and the temperature of the lower plate maintained at 650° C., the upper plate was moved at a speed of 25.4 mm/min to compress the mat material again until the bulk density was 0.50 g/cm$^3$, and the mat material was maintained for 10 minutes.

Next, the temperature of the upper plate maintained at 900° C. and the temperature of the lower plate maintained at 650° C., the upper plate was moved at a speed of 25.4 mm/min to decompress the mat material again until the bulk density was 0.45 g/cm$^3$, and the mat material was maintained for 10 minutes.

The step of compressing the mat material again to a bulk density of 0.50 g/cm$^3$ and the step of decompressing the mat material again to a bulk density of 0.45 g/cm$^3$ as one cycle was repeated 1000 times. After 1000 repetitions of the cycle, the compression surface pressure of each mat material compressed to a bulk density of 0.45 g/cm$^3$ was measured. Table 1 shows the results.

TABLE 1

|  | Example 1 | Comparative Example 1 | Comparative Example 2 |
|---|---|---|---|
| Use of surfactant in defibrating step | Used | Used | Used |
| Inorganic binder | Present | Absent | Present |
| Organic binder | Present | Present | Absent |
| Initial compression surface pressure (kPa) | 902 | 812 | 885 |
| Compression surface pressure after compression/expansion test (kPa) | 177 | 157 | 162 |

As shown in Table 1, the presence of the inorganic binder and the organic binder in the mat material was found to sufficiently increase the initial compression surface pressure of the mat material and sufficiently increase the compression surface pressure of the mat material after repeating the compression and decompression.

REFERENCE SIGNS LIST 1 exhaust gas purification device
10 mat material
11 one end
11a protrusion
12 other end
12a recess
20 exhaust gas treatment unit
21 cell
22 cell wall
23 sealing material
30 metal casing

The invention claimed is:

1. A mat material comprising:
   inorganic fibers; and
   an inorganic binder and an organic binder attached to the inorganic fibers,
   wherein the mat material has an initial compression surface pressure of 900 kPa or more as measured when compressed to a bulk density of 0.50 g/cm$^3$,
   the mat material is a mat produced by papermaking, and
   the mat material includes twisted strings of the inorganic fibers twisted together, and in a cross section parallel to a thickness direction of the mat material, a cross-sectional area percentage of the twisted strings is 0.5% or more and 10% or less relative to a cross-sectional area of the mat material.

2. The mat material according to claim 1,
   wherein the mat material is produced by subjecting an inorganic fiber-binder mixture to papermaking, the inorganic fiber-binder mixture being a mixture of an inorganic fiber dispersion containing inorganic fibers having an underwater bulk specific gravity of 0.001 to 0.02 g/cm$^3$, an inorganic binder, and an organic binder.

3. A method of producing a mat material, the method comprising:
   a defibrating step of defibrating pre-defibration inorganic fibers by adding water to the pre-defibration inorganic fibers to produce an inorganic fiber dispersion;
   an inorganic fiber-binder mixture producing step of mixing the inorganic fiber dispersion with an inorganic binder and an organic binder to obtain an inorganic fiber-binder mixture;
   a papermaking step of subjecting the inorganic fiber-binder mixture to papermaking and dehydration to obtain a mat precursor; and
   a heating and pressurizing step of heating and pressurizing the mat precursor to obtain a mat material,
   wherein in the defibrating step, the pre-defibration inorganic fibers are defibrated such that the inorganic fibers after defibration have an underwater bulk specific gravity of 0.001 to 0.02 g/cm$^3$.

4. A mat material comprising:
   inorganic fibers; and
   an inorganic binder and an organic binder attached to the inorganic fibers,
   wherein the mat material has an initial compression surface pressure of 900 kPa or more as measured when compressed to a bulk density of 0.50 g/cm$^3$,
   the mat material is a mat produced by papermaking, and
   the mat material is produced by subjecting an inorganic fiber-binder mixture to papermaking, the inorganic fiber-binder mixture being a mixture of an inorganic fiber dispersion containing inorganic fibers having an underwater bulk specific gravity of 0.001 to 0.02 g/cm$^3$, an inorganic binder, and an organic binder.

* * * * *